March 1, 1955  P. GANDERT ET AL  2,703,048
INSURANCE POLICY VENDING AND VALIDATING APPARATUS
Filed Aug. 3, 1951  7 Sheets-Sheet 1

Philip Gandert
Hollis B. Smith
INVENTORS

BY
ATTORNEY

March 1, 1955 P. GANDERT ET AL 2,703,048
INSURANCE POLICY VENDING AND VALIDATING APPARATUS
Filed Aug. 3, 1951 7 Sheets-Sheet 2

Philip Gandert
Hollis B. Smith
INVENTORS

ATTORNEY

March 1, 1955 P. GANDERT ET AL 2,703,048
INSURANCE POLICY VENDING AND VALIDATING APPARATUS
Filed Aug. 3, 1951 7 Sheets-Sheet 3

Philip Gandert
Hollis B. Smith
INVENTORS

BY Philip G. Hilbert
ATTORNEY

March 1, 1955  P. GANDERT ET AL  2,703,048
INSURANCE POLICY VENDING AND VALIDATING APPARATUS
Filed Aug. 3, 1951  7 Sheets-Sheet 4

FIG. 11
FIG. 9
FIG. 10

Philip Gandert
Hollis B. Smith
INVENTORS

BY Philip G. Hilbert
ATTORNEY

March 1, 1955 P. GANDERT ET AL 2,703,048
INSURANCE POLICY VENDING AND VALIDATING APPARATUS
Filed Aug. 3, 1951 7 Sheets-Sheet 6

Philip Gandert
Hollis B. Smith
INVENTORS

BY
ATTORNEY

United States Patent Office 2,703,048
Patented Mar. 1, 1955

2,703,048

INSURANCE POLICY VENDING AND VALIDATING APPARATUS

Philip Gandert, Bronx, N. Y., and Hollis B. Smith, Little Ferry, N. J., assignors to Tele-Trip Policy Co., Inc., New York, N. Y.

Application August 3, 1951, Serial No. 240,172

13 Claims. (Cl. 101—90)

This invention relates to the vending of insurance, such as term accident insurance for travelers, and more particularly to improved completely automatic coin actuated apparatus for vending and validating insurance policies and to a novel insurance policy format for use with such apparatus.

The selling of short term accident insurance for travelers at railway stations, airports, bus terminals, consolidated ticket offices and similar locations is now a standard practice. The selling and validating of the policies, computation of premium charges, and bookkeeping details have usually been done manually by the ticket agent. This requires some time, which is not favored either by the agent or by a traveler who is in a hurry. Consequently, the full potential sales of this form of insurance have been far from realized.

To avoid these delays, it has been proposed to use vending machines in which the traveler can insert coins corresponding in value to the number of days insurance desired, after which the machine can be operated to deliver a validated policy to the purchaser. These policies are usually in rolled strip form, with a duplicate strip of policies remaining in the machine. As the policy is delivered, it must be removed from the strip by the purchaser. These machines have been bulky, expensive, complicated, heavy, and generally not adaptable to mounting in the limited space available at a ticket window. Consequently, they have not been conspicuously located and thus have not realized nearly their full sales potential.

In the copending application of John M. Shahean and Philip Gandert, Serial No. 236,708, filed July 14, 1951, for "Insurance Policy and Method of and Apparatus for Vending the Same", there is described and claimed a novel insurance vending and validating arrangement operating upon a new and radically different principle. Specifically, policy forms are stacked in a rack outside a validating apparatus. The policy forms have a special format in which, when the policy is folded, an inked or carbon paper layer on the back surface of the top sheet overlies a second sheet which is a duplicate of the top sheet. The purchaser fills in certain data on the top sheet, places the policy in a slot in the validating apparatus, and deposits therein a number of coins corresponding to the desired number of days of insurance coverage. A validating button is then actuated to cause the machine to stamp the date and time of purchase, serial number, and coverage time on the top sheet of the policy, this data also being impressed on the second sheet by virtue of the transfer means. The top sheet is then torn off and deposited through a "stub" slot for record purposes, with the purchaser keeping the remainder of the policy.

This apparatus differs fundamentally from prior insurance vending arrangements in that the policy forms are outside the machine and freely available for inspection as well as filling in of personal data. The apparatus is merely used for validating the policy, whereby its size and weight are reduced to the point where the machine is compact enough for ready mounting in limited space, as upon a ticket counter.

The present invention is directed to an improved policy format and completely automatic coin actuated validating apparatus operating on the same principle as the arrangement of said copending application. In the present arrangement, the folded policy is placed in a slot in a predetermined manner, the required number of coins are inserted, and the purchaser presses an operating lever. The apparatus then goes through an operating cycle in which the policy is mechanically gripped and held while a stub is torn off mechanically and delivered to a stub receptacle. At the start of the cycle, the time, date, serial number and countersignature are stamped on the stub and, by virtue of transfer means on the back of the stub, onto an underlying sheet forming part of the policy portion retained by the purchaser. At the end of the cycle, the apparatus re-sets itself and releases the policy to the purchaser.

One end of the folded policy is formed with a bevelled corner. If the policy is properly inserted into the slot, this bevelled corner permits free motion of one feeler wire while the non-bevelled corner obstructs motion of a second feeler wire. Under these conditions, the apparatus will go through its cycle. Should, however, the policy be inserted wrong end first or inverted, the first feeler wire is obstructed and the second feeler wire may or may not be obstructed. The two feeler wires control series connected switches which must be closed to condition the apparatus to go through its cycle. Both switches are closed only when the policy is properly inserted in the slot, so that the policy can not be improperly operated on by the validating apparatus.

When the policy is inserted in the slot, the inner or stub end is engaged with a pair of friction rollers. As the purchaser depresses the operating handle, an eccentric roller grips the body of the policy against a wall of the slot. The pair of rollers are then rotated to pull the stub from the policy body along a line of perforations. Previous to such extraction, a printing head will have stamped the identifying data and validation on the stub and the policy.

The end of the apparatus facing the purchaser has a visible, re-set dial which indicates the amount deposited in a substantially standard coin chute and slug rejector assembly forming part of the apparatus. This dial is mechanically linked to a reset printing head which prints this amount on the policy stub. A second non-reset printing head prints consecutive serial numbers on the policies. A pair of concealed totalizer dials indicate the total number of policies sold and the total amount of money collected.

A further feature of the apparatus is the ready detachability of the printing and indicating head from the rest of the apparatus, for ready inspection or repair. The operating motor, as well as the stub extracting and cycling mechanism are also readily removable for inspection or repair.

For an understanding of the invention principles, reference is made to the following detailed description of a typical embodiment thereof as illustrated in the accompanying drawings. In the drawings.

Figures 1, 2, 3:
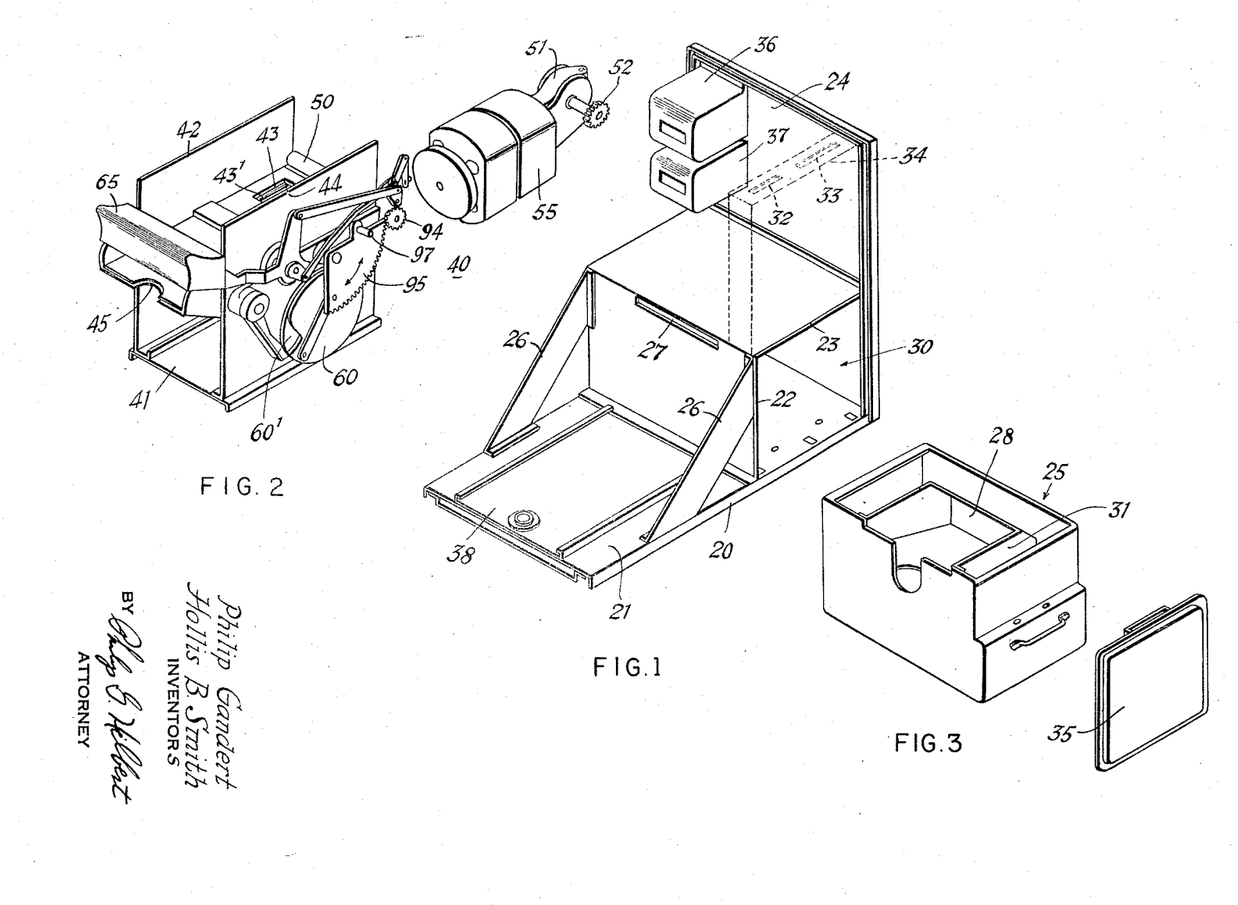
Figs. 1, 2 and 3 conjointly provide an exploded perspective view of the frame of the validating apparatus, the stub and coin receptacle, the operating motor, and the stub extractor.
Figure 4:
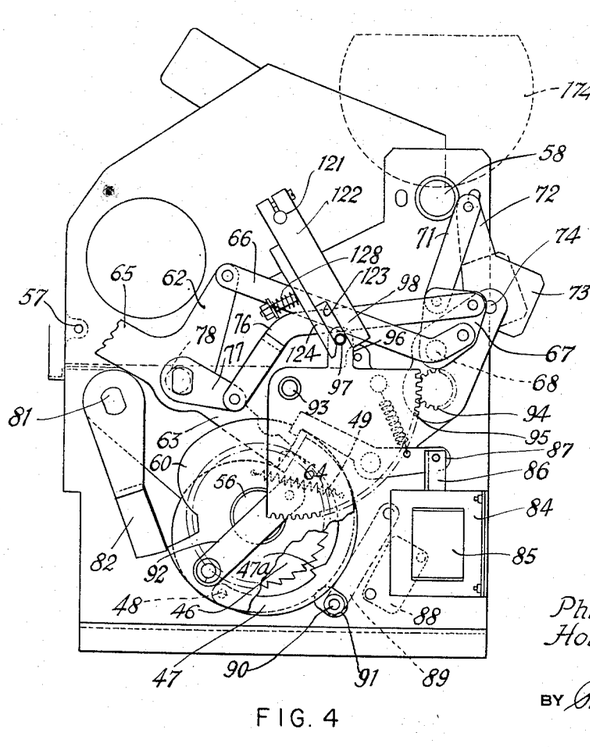
Fig. 4 is a right side elevation view of the stub extractor and printing head, the latter being shown only in outline.
Figure 5:
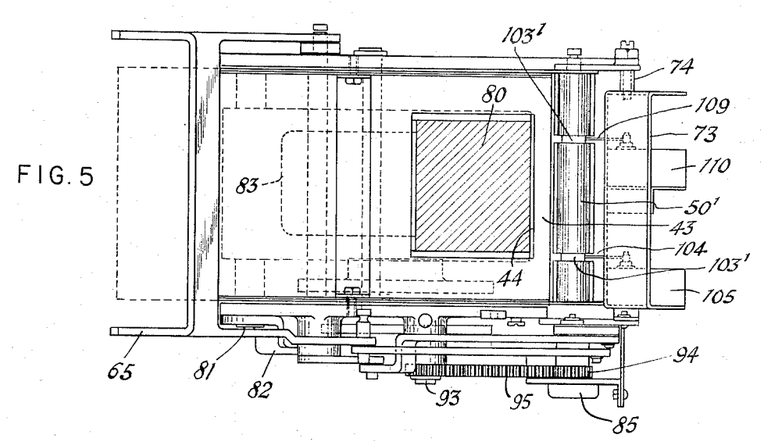
Fig. 5 is a plan view of the policy slot and stub extractor.
Figure 6:
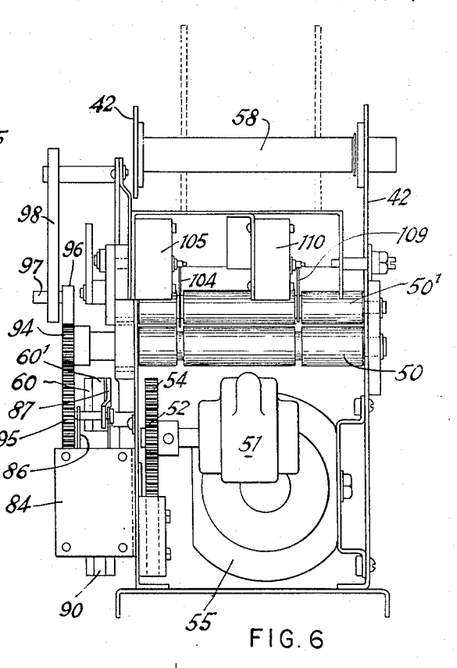
Fig. 6 is an inner end view of the stub extractor.
Figure 7:
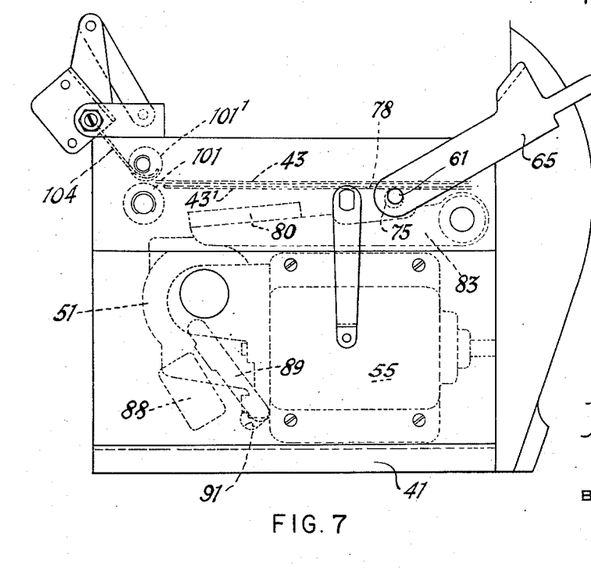
Fig. 7 is a left side elevation view of the stub extractor.
Figure 8:
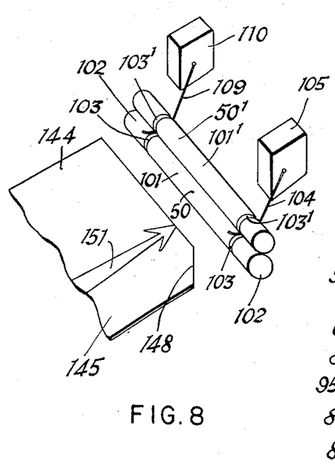
Fig. 8 is a perspective view of the stub extractor rollers and associated feeler wires and switches.

Referring first to Figs. 1, 2 and 3 of the drawings, the validating apparatus includes a main frame 20 having a flat base 21 in the form of a shallow inverted channel. Intermediate its length, base 21 has secured thereto an upright wall 22 connected by a shelf 23 to a rear wall 24 to form a housing or compartment 30 for cash and stub drawer 25. Wall 22 is braced by diagonals 26 and has a slot 27 for delivery of stubs into a compartment 28 within the cash drawer 25. A forward compartment 31 in drawer 25 receives tokens or quarters deposited in slots 32, 33 respectively of a substantially standard coin chute and slug rejector shown in dotted outline at 34. A locking door 35 is provided for compartment 30.

A pair of totalizing counters 36, 37 are mounted near the left and upper edges of rear wall 24. One of these counters registers the total number of policies sold by counting the number of times the operating handle is actuated. The other counter registers the total amount of money deposited through chute 34. Normally these counters are concealed by a casing enclosing the apparatus.

Base 21 has a shallow channel 38 on its upper surface providing a locating and guiding means for the stub extracting and validator cycling unit generally indicated at 40 and shown more in detail in Figs. 4 through 7. This mechanism includes an inverted channel base 41 fitting over channel 38, and side walls 42 extending upwardly from the base.

The policy receiving slot 45 is located intermediate the height of walls 42 and in such position as to align with slot 27 in wall 22. This slot comprises spaced parallel walls 43, 43', the walls being cut out adjacent their inner ends at 44 to expose the policy to the printing mechanism and support platen. The walls 43, 43' terminate just in advance of a pair of stub extracting rollers 50, 50'.

Slot 45, with base 41 and the lower portions of walls 42, form a compartment for the driving motor 55 of the apparatus. Motor 55, through a gear reduction unit 51, drives a pinion 52. The motor has a mounting plate 53 on one side by means of which the motor can be disengageably mounted on one wall 42 in unit 40. When the motor is mounted in the unit, pinion 52 meshes with a drive gear 54 on a shaft 56 rotatably mounted through the other wall 42. The outer end of shaft 56 has fixed thereon a ratchet 46 engageable with a pawl 47 rotatable with a pair of operating cams 60, 60' freely rotatable on shaft 56. Pawl 47 has a tooth 47a engageable with the teeth of ratchet 46.

Figures 9, 11:
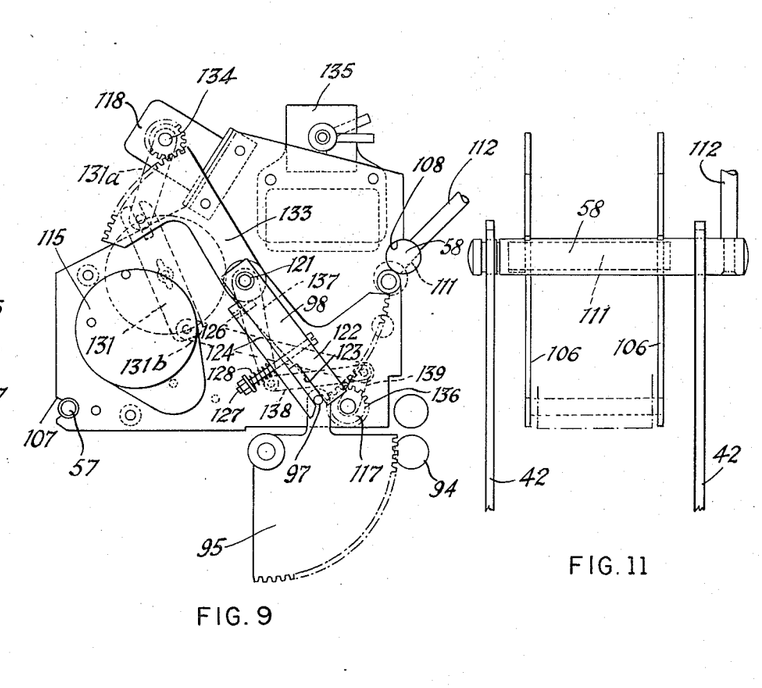
Fig. 9 is a side elevation view of the printing head.
Figs. 10 and 11 are opposite end elevation views of the printing head.
Figure 10:
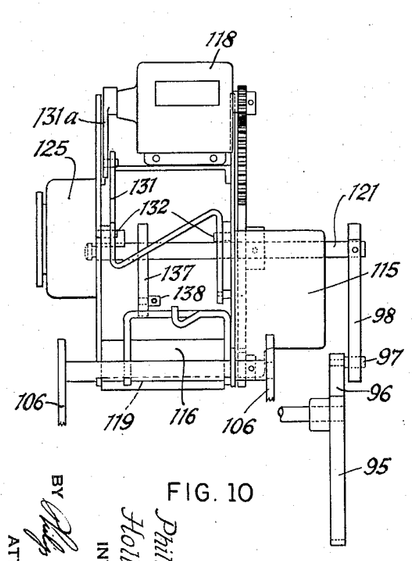

The slot 45 with the upper portions of walls 42 forms a compartment for the printing and indicating unit 70 shown in detail in Figs. 9, 10 and 11. This unit is locked to unit 40, in a manner more fully described hereinafter, by means cooperating with an outer fixed transverse shaft 57 and an inner rotatable shaft 58, both mounted in walls 42 or extensions thereof.

Referring to Figs. 4 through 7, illustrating the stub extracting and cycling unit, the validator is operated by a handle 65 freely pivoted on a shaft 61. The inner end of the handle is formed as a crank having an arm 62, and has a projecting lug 63 normally engaged with a shoulder 64 on cam 60' and the free end of pawl 47. The latter is a curved member pivoted at 48 between the two cams and having a radius of curvature equal to the largest radius of the cams. A spring 49 biases pawl 47 toward an inner position concentric with the cams and engaged with ratchet 46. However, in the idle position of the apparatus, pawl 47 is held in an eccentric position in a manner described hereinafter.

A link 66 connects arm 62 to a crank 67 pivoted to wall 42 at 68. A link 71 connects crank 67 to an arm 72 on a switch mount 73 pivoted on pins 74 in walls 42. A bent link 76 connects crank 67 to a crank 77 fixed to shaft 61. This shaft carries an eccentric roller 75 extending through a slot 78 in lower slot plate 43' and normally flush with the upper surface of this plate. A shaft 81 extends transversely of the unit at its outer end and has fixed to one outer end a pawl 82 engaging cam 60. Intermediate walls 42, shaft 81 has fixed thereto a forked crank 83 carrying a platen 80 at its outer end aligned with opening 44 in plates 43.

The operation of the unit, as will be described, is initiated by the action of a solenoid 85 mounted in a bracket 84 secured to a wall 42. The armature 86 of this solenoid is connected to a spring biased pivoted latch 87 engaged with cam 60' and the free end of pawl 47. The energizing circuit for solenoid 85 includes a double pole switch 88 mounted on wall 42 and having an operating arm 89 carrying a roller 90 extending through a slot 91 in wall 42.

In the idle position, latch 87 holds pawl 47 eccentric to the cams and holding roller 90 outwardly to operate switch 88 to a position closing the energizing circuit of solenoid 85. When the latter is energized, in a manner to be described, latch 87 is disengaged from pawl 47.

Cam 60 has a link 92 eccentrically pivoted thereto and connected to a gear sector 95 pivoted on a shaft 93. Sector 90 meshes with a pinion 94 secured to the lower stub extracting roller 50. Sector 95 has an ear 96 carrying a pin 97 engaged in an operating arm 98 of the printing unit 70 and described more fully hereinafter.

The stub extracting rollers 50, 50' form an important feature of the invention. These are friction rollers, each having its fricton surface divided into a relatively long intermediate section 101, 101' separated from shorter end sections 102, 102' by circumferential slots 103, 103'. The slots in the two rollers are aligned, and the upper slots 103, receive the curved ends of operating wires 104 and 109 for a pair of switches 105 and 110 mounted on member 73. When member 73 is swung counterclockwise, as viewed in Fig. 4, the wires 104, 109 can swing freely through the slots 103, 103' unless obstructed. It should be noted that the operating wires are curved somewhat about the upper roller 50'. For a purpose described hereinafter, switch 105 is normally closed and switch 110 is normally open. The switch operating wires act as feelers for insuring correct insertion of the folded policy blank into slot 45.

The printing unit 70 is shown in Figs. 9, 10 and 11. The unit includes a pair of spaced walls 106, 106 each having a notch 107 in its forward edge arranged to engage shaft 57. The plates also each have a semi-circular notch 108 in its rear edge cooperable with shaft 58. This shaft has a flattened surface 111 and an operating handle 112. When surface 111 faces notches 108, unit 70 may be swung about shaft 57 for disengagement from shaft 57. When the cylindrical surface of shaft 58 is engaged in notches 108, unit 70 is locked to unit 40.

Unit 70 includes a time stamp mechanism operated by a synchronous motor 115 and having a date and time printing head 116. The unit also has a re-set "amount" printing head 117 mechanically linked to a re-set visual counter 118, and a non-reset serial number printing head 119.

The unit operating arm 98 is mounted on an extended shaft 121, and is designed to permit overtravel of pin 97. For this purpose, arm 98 includes a bar 122 secured to shaft 121 and notched at its outer end as at 123. A second bar 124 overlies notch 123, and has a pin 126 seating in bar 122. A second headed pin 127 extends through bar 124 into arm 122 and carries a spring 128 biasing bar 124 toward bar 122. This spring biased arrangement permits "give" of bar 124 to permit overtravel of pin 97.

Visual counter 118 is stepped by a rotary solenoid 125, "amount" printer 117 being correspondingly stepped through a lever 131 pivoted on pins 132 and connected at one end to counter 118 by link 131a and at the other end to head 117 by link 131b. Thus, each time counter 118 is stepped by solenoid 125, printer 117 is correspondingly stepped.

Re-setting of counter 118 and printer 117 is effeced by a double gear sector 133 secured to rotate with shaft 121. The upper half of gear sector 133 meshes with the re-set pinion 134 of counter 118 and the lower half with the re-set pinion 136 of printer 117. Each time arm 98 is swung by oscillation of sector 95, shaft 121 and sector 133 are oscillated to re-set counter 118 and printer 117. At the same time, the serial number printer is advanced one unit by a crank 137 fixed to shaft 121 and connected by a link 138 to the operating arm 139 of printer 119. A half wave rectifier 135 on unit 70 provides unidirectional current for the mechanism.

Figure 13:
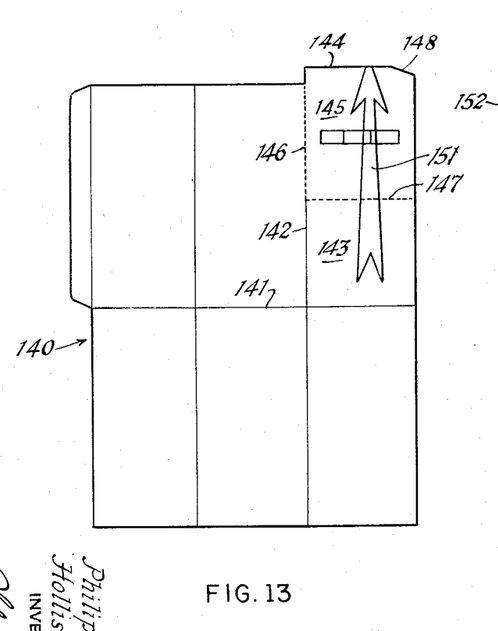
Fig. 13 is a partial front plan view of the open policy form.
Figure 14:
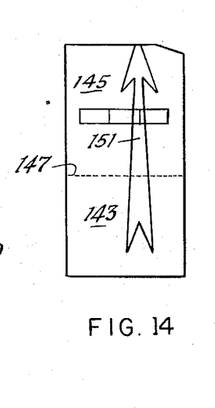
Fig. 14 is a plan view of the folded policy form as inserted in the validating apparatus.
Figure 15:
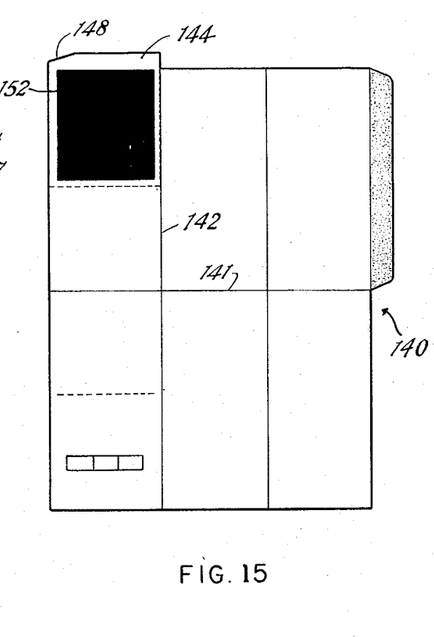
Fig. 15 is a rear plan view of the top sheet of the folded policy.

Before the operation of the validating mechanism is described, reference is made to the novel policy format shown in Figs. 13, 14 and 15. This format comprises a sheet 140 which may be folded in half along a transverse line 141 and then folded along two lines such as 142 to provide six panels each having a front and rear face. In the folded condition of sheet 140, a front stub panel 143 is on top, and it will be noted that this panel extends beyond the others to provide a projecting tab 144.

Tab 144 forms the outer edge of a detachable stub 145 which may be torn from panel 143 along perforations 146, 147. An important feature of stub 145 is that the left outer corner of tab 144 is a right angle, while the right outer corner is cut back or bevelled as at 148. This feature assures that the validator cannot be operated unless the policy form is properly inserted.

Panel 140 is imprinted with an arrow 151 for indicating the proper direction to insert the policy into slot 45. The stub portion 145 carries spaces for the printing of the date and time, and the writing in of the name and address of the purchaser.

As will be seen from Fig. 15, the rear surface of stub 145 is covered with transfer material 152, such as carbon paper. By virtue of material 152, the information printed or written on stub 145 is duplicated on a second panel 150 which underlies panel 143 in the folded condition of the policy. The portion of panel 150 underlying stub 145 has a format substantially duplicating that of stub 145. The remaining panels of the policy form carry instructions and the insurance provisions. One panel may have a glued flap and be printed as an envelope so that the validated policy may be readily mailed to the purchaser's home.

Figure 12:
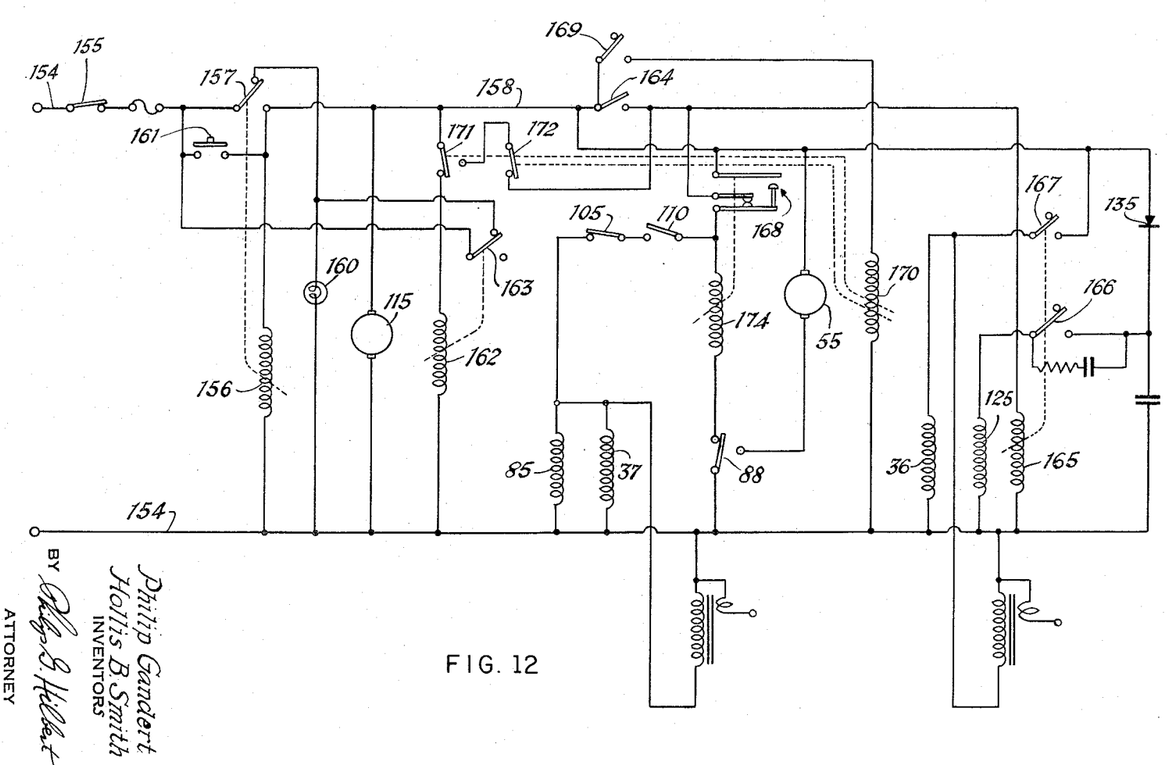
Fig. 12 is a schematic wiring diagram of the apparatus.

The operating cycle of the machine will be described with additional reference to the wiring diagram of Fig. 12. The machine may be activated by dropping quarters into slot 33 or by dropping special tokens into slot 32. The apparatus is energized over lines 154, through a control switch 155. A "tattle-tale" relay 156 is provided with an armature 157 which, when power is on lines 154, connects the upper line 154 to line 158. Should power fail and relay 156 drop, armature 157 connects upper line 154 to a warning lamp 160. When power is restored, lamp 160 lights, indicating that the timing mechanism must be re-set. A re-set button 161 is provided to pick up relay 156. Lamp 160 is also lighted when a spurious coin or slug is inserted, by virtue of a reject magnet 162 having a normally open armature 163. Synchronous motor 115 for the time stamp is connected across lines 154, 158.

Each quarter deposited in slot 33 operates a switch 164 to step an impulse relay 165 whose armatures 166 and 167 step the display counter 125 and the totalizing counter 36. Switch 164 also energizes holding solenoid 174 whose contacts 168 switch connections from the coin controlled circuit to line 158. When a token is inserted in slot 32, solenoid 170 is energized through switch 169 to give four impulses to relay 165. This is effected through contacts 171, 172, forming a 4:1 dial switch which cuts reject magnet 162 out of circuit and shunts "quarter" switch 164. When holding relay 174 operates, switches 105 and 110 are connected to line 158 to control the cycling mechanism and the cycle counter 37. These switches also control coil of solenoid 85 for operating latch 67 to release pawl 47 to engage ratchet 46 and connect motor 55 to the cams 60, 60'. The motor 55 is connected between lines 154, 158 by switch 88, which normally is in the circuit of coil 174 when pawl 47 is in the eccentric position. As will be described, when pawl 47 is released from lug 63 by operation of handle 65, it is pulled inwardly by spring 49 so that roller 90 moves inwardly to deenergize solenoid 85. As the cams near the end of their cycle of operation, latch 87 drops back into engagement with pawl 47, swinging the latter outwardly to disengage ratchet 46 and swing roller 90 to operate switch 88 to deenergize motor 55. The motor and gear reducer are thus disconnected from the cams and coast to a stop.

To operate the validator, the proper number of quarters or tokens are inserted, corresponding to the desired term of insurance. Each token preferably represents a dollar. As described, this steps the several counters and printing heads. The policy is inserted into slot 45 with the stub tab leading. If the policy is properly inserted, the right angle corner of tab 144 will block movement of switch wire 109 toward slot 103 of lower roller 50, whereas cut off corner 148 will provide clearance for wire 104 to move through the other slot 103. When handle 65 is depressed crank 67 is swung counterclockwise. This swings switch mounting member 73 counterclockwise, carrying switches 105, 110 and their operating wires with it. As wire 104 can move freely, normally closed switch 105 is not operated. However, the obstruction of wire 109 by the right angle corner of stub tab 144 causes this wire to close switch 110.

Crank 67, through link 76, operates crank 77 to turn eccentric 75 to firmly grip the policy body against upper slot plate 43. Handle 65 also releases stop 63 from shoulder 64 and pawl 47. The pawl is pulled in by spring 49 to operate switch 88 to drop coil 174 and start motor 55, and to engage ratchet 46 so that the cams are rotated by the motor. Latch 87 is held out by riding on the outer surface of cam 60', even though coil 85 is deenergized.

Arm 82 snaps into the recess of cam 60 to swing platen 80 against the policy to press stub 145 against the printing head, the platen being immediately retracted by arm 82 being moved outwardly by the cam. The roller 50 is not operated immediately, as the relation of cam 60, link 92 and a sector 95 is such that the sector begins to move only after the cams have moved through a substantial arc. Thus, the tearing off of the policy stub is delayed until platen 80 has been retracted.

Motor 55 continues to rotate the cams which, through link 92, swing sector 95 counterclockwise. This rotates pinion 94 to rotate lower friction roller 50 counterclockwise to pull stub 145 off the policy blank and discharge it through slot 27 into the cash and stub drawer.

Through pin 97 and arm 98, shaft 121 of printing unit 70 is rotated. As cams 60, 60' continue their rotation, the movement of sector 95 is reversed. While this reverses roller 50, there is no effect as the stub has already been torn off. The reverse movement of shaft 121 operates sector 133 to rotate the re-set pinions 134, 136 to re-set counter 118 and head 117. Also, the crank 137, link 138 and arm 139 advance the serial number printer by one unit.

When stop 63 is released from shoulder 64, it rides on the surface of cam 60' to retain handle 65 across the opening of chute or slot 45. Near the end of the cycle, latch 87 drops back into engagement with pawl 47 and then shoulder 64. Pawl 47 is swung out to disengage ratchet 46 and swing roller 90 outwardly. Switch 88 is thus reversed to deenergize motor 55, which is now disconnected from the cams and coasts to a stop. The mouth of the policy slot 45 is not clear so that the validated and countersigned policy may be withdrawn. Also, the validating apparatus is now re-set for another cycle of operation.

Figures 16, 17, 18:
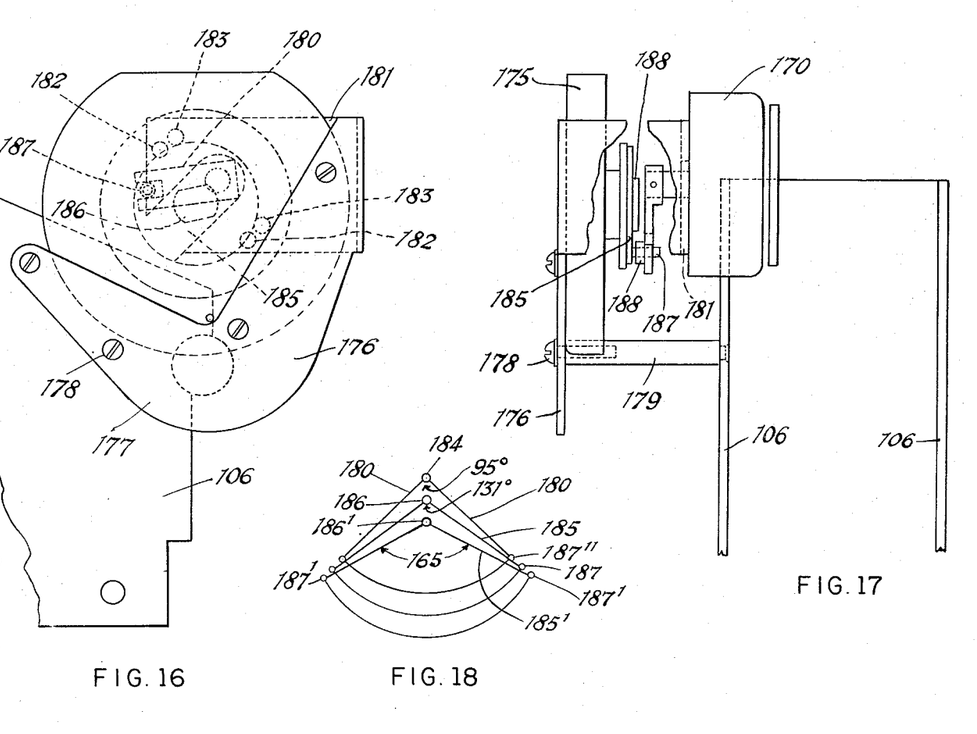
Fig. 16 is a partial side elevation view of the printing unit illustrating an adjustable multiple impulse device actuable by a deposited token.
Fig. 17 is a broken away end elevation view of the device shown in Fig. 16.
Fig. 18 is a diagram illustrating the principle of the device shown in Fig. 16.

Figs. 16, 17 and 18 illustrate the construction and principle of operation of the device 170 for providing a predetermined plurality of impulses responsive to the dropping of a token into slot 32 of coin chute 34. In a typical example, each token may have a value of $1.00 when the machine receives quarters. Thus, each token must step the counters and printing head four (4) times. Device 170 is, however, adjustable to provide for five (5) impulses if a token is valued at, for example, $1.25.

The solenoid 170 is a rotary solenoid which is energized each time switch 169 is operated by a token to drive a telephone dialing arrangement 175 having contacts schematically indicated at 171, 172. Arrangement 175 opens switch 171 and then operates switch 172 a number of times corresponding to the comparative money value of the token.

As is generally known, a telephone dialer has eleven (11) contacts evenly spaced through 360°. Thus, the dial must be rotated substantially 33° for each impulse. For four (4) impulses, the arc of rotation must be about 130°, and for five (5) impulses, the arc must be about 165°. However, the arc of operation of rotary solenoid 170 is only about 95°. The arrangement of Figs. 16, 17, and 18 provides a novel set up for obtaining the required operating arc of the dialer with a much smaller operating arc of solenoid 170.

The token responsive impulsing device is mounted in a U-shaped bracket 176 having one wall 177 secured in spaced relation to the front wall 106 of unit 70 by bolts 178 engaged in studs 179 projecting from wall 106. The rear wall 181 of bracket 176 has two pair of mounting holes 182 and 183 for adjustably mounting rotary solenoid 170. The lower set 182 is used for a four (4) impulse arrangement, and the upper set 183 for a five (5) impulse arrangement.

Solenoid 170 has a shaft 184 to which is secured a forked radial driving arm 180. Dialer 175 is mounted on wall 177 with its axis offset from that of shaft 184.

The amount of offset is adjusted in accordance with which set of holes, 182 or 183, is used to mount solenoid 170 on rear wall 181 of bracket 176.

Dialer 175 has an operating shaft 186 extending toward solenoid 170. An operated arm 185 is secured to shaft 186, and carries a pin 187 engaged in a bearing 188 riding in the slot of arm 180. Arm 185 is held in place by a washer 191 secured to the outer end of shaft 186 and overlying arm 185.

The theory of operation will be understood from Fig. 18, which is illustratively diagrammatic only, and not accurately drawn to scale. The center 184 with the two extreme positions of arm 180 form the operating angle of the solenoid 170, this angle being 95°. By offsetting shaft 186 from shaft 184, with pin 187 engaged in arm 180, the included angle of arm 185, in the first position is increased to 131°. By further offsetting shaft 186 to the position 186', the included angle of arm 185 is increased to 165°. Such further offset is effected by mounting solenoid 170 in the outer holes 183.

The described apparatus requires no time of the ticket agent, being completely controlled by the insured. The several components may be easily disassembled from each other for ready inspection, repair, or re-setting. The entire device is small and compact so that it may readily be located in a limited space on a ticket window or counter.

While a specific embodiment of the invention has been shown and described in detail to illustrate the invention principles, it will be understood that the invention may be embodied otherwise without departing from such principles.

What is claimed is:

1. Validating apparatus for use with a format having a validating stub at one end removable therefrom by separation along lines of perforations, said apparatus comprising, in combination, a pair of parallel walls forming a format receiving slot; a time stamp having a printing head adjacent an opening in said slot aligned with such stub; a platen movably mounted relative to such opening; means operable, responsive to operation of said handle, to move said platen to engage the face of the stub with the printing head; said platen operating means immediately retracting said platen; clamping means operatively associated with said slot and effective, when actuated to clamp the format body firmly against a wall of the slot; friction means adjacent the inner end of said slot arranged to grip the stub; driving means for said friction means to operate the latter to pull the stub from the format; means interconnecting said handle and said clamping means for actuation of said clamping means to clamp the format body against movement in the slot; said printing head including a serial number printer and a re-set amount printer; coin controlled means conditioning said platen operating means and said driving means for operation; operating connections between said coin-controlled means and said amount printer; sequential operation means controlled by operation of said handle and effective to energize said driving means subsequent to operation of said platen; and driving means interconnecting said sequential operation means and said printers and operable by said sequential operation means, during each cycle of the latter, to advance said number printer by one unit and to re-set said amount printer.

2. Apparatus as claimed in claim 1 including a re-set visual amount counter and linkage interconnecting said counter and said amount printer for simultaneous actuation and re-setting.

3. In combination, a format having a panel with a removable stub at one end joined to the panel along lines of perforation, said stub being substantially rectangular and having one right angle corner on its outer edge and one cut back corner thereon; a pair of parallel walls forming a format receiving slot; a pair of friction rollers rotatably mounted adjacent the inner end of said slot to grip said stub, each roller having a pair of axially spaced circumferential grooves therein, the corresponding grooves of the two rollers being aligned; a mounting member pivotally mounted adjacent said rollers on an axis parallel thereto; a normally closed switch and a normally open switch mounted on said arm; each switch having an arcuate ended operating arm lying in and extending partly around a different groove of one roller and said arms, when said member is pivoted, having unobstructed movement away from such one roller through the grooves of the other roller; electrically operable means for rotating said rollers to tear off said stub, the energizing circuit for said electrically operable means including said switches in series; whereby, when said format is inserted into said slot in a predetermined manner, said right angled corner will obstruct movement of the arm of the normally open switch, when said member is swung, to close said normally open switch and said cut back corner will clear the arm of the normally closed switch so that the latter remains closed, the energizing circuit being thereby completed, and when said format is inserted in said slot in any other manner, said normally closed switch will open or said normally open switch will remain open and, when no format is inserted, said formally open switch remains open; an operating handle; clamping means operatively associated with said slot and effective, when actuated to clamp the format body firmly against a wall of the slot; and linkage connecting said handle to said member to swing the batter when said handle is operated.

4. The combination claimed in claim 3 including sequential operation means controlled by said handle and effective to activate the energizing circuit.

5. Apparatus as claimed in claim 1 in which said sequential operation means includes a shaft, a motor driving said shaft, cam means freely rotatable on said shaft, clutch means selectively operable to connect said cams to said shaft, latch means normally holding said clutch means disengaged, and means operable by said handle to release said latch means to engage said clutch.

6. Apparatus as claimed in claim 1 in which said sequential operation means includes a shaft, a motor driving said shaft, cam means freely rotatable on said shaft, clutch means selectively operable to connect said cams to said shaft, latch means normally holding said clutch means disengaged, and means operable by said handle to release said latch means to engage said clutch; said cam means and said latch means coacting to re-engage said latch means to disengage said clutch as the cycle nears its end.

7. Validating apparatus for use with a folded sheet format having superposed panels, one of said panels including a stub portion having a tab projecting beyond the forward edge of an underlying panel, said stub portion being removable from said one panel by separation along lines of perforations, said apparatus comprising in combination, a wall for supporting said format, clamping means comprising an eccentrically mounted roller movable from a normally inoperative position towards said wall to fix said format against said wall, actuating means comprising a pivoted handle, linkage means connecting said handle and roller for moving said roller to its operative position, a pair of friction rollers adjacent one end of said wall for receiving the tab of said stub portion therebetween, means for rotating one of said pair of rollers, a motor for driving said rotating means, coin operated switch means for controlling the operation of said motor, and switch means operable in response to movement of said handle for energizing said motor whereby said stub is pulled forwardly while said format is retained in its clamped position.

8. Apparatus as in claim 7, wherein said rotating means comprises a pinion gear on one of said pair of rollers, a sector gear meshing with said pinion gear and cam means connected to said sector gear and arranged for cyclical operation by said motor.

9. Apparatus as in claim 7 wherein said last mentioned switch means comprises a normally closed switch and a normally open switch in series therewith, said second mentioned switch being arranged to be closed in response to engagement by a selected edge portion of the tab on said format, said second mentioned switch remaining open when any other edge portion of said tab or the format panel is presented thereto.

10. Apparatus for use with a sheet including a stub portion removable therefrom along lines of perforations comprising means for clamping said sheet against longitudinal movement, a pair of friction rollers for receiving therebetween the forward edge of said stub portion, means for driving said rollers to advance said stub portion longitudinally and to separate the same from said sheet, said means including a motor, a normally open switch and a normally closed switch in series therewith for controlling said motor, each switch including a displaceable actuating member located adjacent said rollers and adapted to be engaged by edge portions of said sheet, said actuating members being disposed in spaced relation to each other, said actuating members being adapted to take relative positions upon contact thereof by an edge portion of said sheet having a predetermined configuration whereby said first mentioned switch is closed and said second mentioned switch is retained in closed position, said actuating members being further adapted to take relative positions upon contact thereof by edge portions of said sheet having a configuration other than said predetermined configuration whereby at least one of said switches is in its open position.

11. Apparatus as in claim 10 and further including swingable means for mounting said switches, means for moving said swingable means to bring the actuating members of the switches mounted thereon into operative position.

12. Apparatus as in claim 11 and further including means connecting said moving means and said clamping means for actuating said clamping means.

13. Apparatus as in claim 12 and further including a time stamp comprising a printing head for imprinting said stub portion, a platen movably mounted to press said stub portion against said printing head, and means connecting said platen with said moving means for actuating said platen.

References Cited in the file of this patent

UNITED STATES PATENTS

| Number | Name | Date |
|---|---|---|
| 1,269,979 | Tily | June 18, 1918 |
| 1,757,094 | Pollak | May 6, 1930 |
| 1,868,027 | Setright | July 19, 1932 |
| 1,881,090 | Moulton | Oct. 4, 1932 |
| 1,923,478 | Drummond | Aug. 22, 1933 |
| 2,056,315 | Finfrock | Oct. 6, 1936 |
| 2,122,550 | Adrian | July 5, 1938 |
| 2,246,228 | Winter | June 17, 1941 |
| 2,262,251 | Rhoades | Nov. 11, 1941 |
| 2,325,536 | Osborne | July 27, 1943 |
| 2,331,351 | Seeley | Oct. 12, 1943 |
| 2,331,635 | Streckfuss | Oct. 12, 1943 |
| 2,355,690 | Zent | Aug. 15, 1944 |
| 2,380,949 | Davidson | Aug. 7, 1945 |
| 2,427,418 | Rast | Sept. 16, 1947 |
| 2,527,996 | Handley | Oct. 31, 1950 |
| 2,543,910 | Houston | Mar. 6, 1951 |